United States Patent [19]
Hadley

[11] Patent Number: 5,751,305
[45] Date of Patent: May 12, 1998

[54] METHOD AND APPARATUS FOR DYNAMICALLY ALIGNING A PRINTER PRINTHEAD

[75] Inventor: LeMoyne F. Hadley, Corvallis, Oreg.

[73] Assignee: Hewlett-Packard Company, Palo Alto, Calif.

[21] Appl. No.: 537,223

[22] Filed: Sep. 29, 1995

[51] Int. Cl.$^6$ .......................... B41S 29/393; B41S 23/00
[52] U.S. Cl. ................................................ 347/19; 347/37
[58] Field of Search .......................... 347/37, 19, 9; 400/279, 323, 708

[56] References Cited

U.S. PATENT DOCUMENTS

| | | | |
|---|---|---|---|
| 4,277,790 | 7/1981 | Heibein | 346/75 |
| 4,339,208 | 7/1982 | Biedermann | 400/124 |
| 4,430,658 | 2/1984 | Fukazawa | 346/75 |
| 4,525,726 | 6/1985 | Mori | 346/75 |
| 4,570,167 | 2/1986 | Sugitani | 346/140 R |
| 4,570,168 | 2/1986 | Sjordal et al. | 346/145 |
| 4,626,867 | 12/1986 | Furukawa et al. | 346/1.1 |
| 4,709,245 | 11/1987 | Piatt | 346/140 R |
| 4,800,396 | 1/1989 | Hertz | 346/1.1 |
| 5,070,410 | 12/1991 | Hadley | 358/296 |
| 5,089,712 | 2/1992 | Holland | 250/557 |
| 5,103,244 | 4/1992 | Gast et al. | 346/1.1 |
| 5,109,239 | 4/1992 | Cobbs et al. | 346/140 R |
| 5,250,956 | 10/1993 | Haselby et al. | 346/1.1 |
| 5,276,467 | 1/1994 | Meyer et al. | 346/1.1 |
| 5,289,208 | 2/1994 | Haselby | 346/140 R |
| 5,297,017 | 3/1994 | Haselby et al. | 346/1.1 |
| 5,397,192 | 3/1995 | Khormaee | 400/708 |
| 5,426,457 | 6/1995 | Raskin | 347/37 |
| 5,451,990 | 9/1995 | Sorenson | 347/37 |

FOREIGN PATENT DOCUMENTS

| | | | |
|---|---|---|---|
| 0313205 A2 | 9/1988 | European Pat. Off. | B41J 25/30 |
| 1791711 | 10/1990 | U.S.S.R. | G01D 15/16 |

*Primary Examiner*—Benjamin R. Fuller
*Assistant Examiner*—Craig A. Hallacher
*Attorney, Agent, or Firm*—Raymond A. Jenski

[57] ABSTRACT

In order to dynamically align one or more printheads in a printer, a referencing mechanism is placed on the printer and a detector is placed on the printhead. The printhead is moved at a known speed past two spaced apart reference indicia of the referencing mechanism. The passing of a first of the spaced apart reference indicia is detected and the passing of a second of the spaced apart reference indicia is detected. The time between the detection of the first reference indicia passage and the detection of the second reference indicia passage is measured and a delay time, related to the measured period of time, is created. Energization of an ink drop ejection is delayed for the duration of the delay time.

32 Claims, 12 Drawing Sheets

METHOD AND APPARATUS FOR DYNAMICALLY ALIGNING A PRINTER PRINTHEAD

BACKGROUND OF THE INVENTION

The present invention relates generally to a method and apparatus for aligning printing mechanisms and more particularly a method and apparatus for aligning multiple printheads or print cartridges in an ink droplet ejection printer such as a thermal inkjet printer.

One conventional type of printer is one which forms characters and images on a medium, such as paper, by expelling droplets of ink in a controlled fashion so that the droplets land on the medium. Such a printer can be conceptualized as a mechanism for moving and placing the medium in a position such that the ink droplets can be placed on the medium, a printing cartridge which controls the flow of ink and expels droplets of ink to the medium, and appropriate control hardware and software. A conventional print cartridge for an inkjet type printer comprises an ink containment device and a fingernail-sized apparatus, commonly known as a printhead, which heats and expels ink droplets in a controlled fashion. Typically, the printhead is a laminate structure including a semiconductor base, a barrier material structure which is honeycombed with ink flow channels, and an orifice plate which is perforated with holes or orifices with diameters smaller than a human hair and arranged in a pattern which allows ink droplets to be expelled in a controlled pattern. In an inkjet printer the heating and expulsion mechanism consists of a plurality of heater resistors formed in the semiconductor substrate and associated with an ink chamber formed in the barrier layer and one of the orifices in the orifice plate. Each of the heater resistors is connected to the controlling mechanism of the printer such that each of the resistors may be independently energized to quickly vaporize to expel a droplet of ink.

In some applications, more than one inkjet print cartridge will be designed into a printer. Usually this multiple print cartridge assembly is created to accommodate multiple colors of ink. Properly controlling the arrangement of various droplets of ink of different colors will result in a wide spectrum of perceivable colors. The clarity and quality of the resultant image is affected by the accuracy of the placement of the ink droplets on the medium. Printers which use multiple print cartridges to cooperatively form a single image usually require mechanical or electronic adjustment so that ink droplets printed by one cartridge alight at precise locations on the receiving medium relative to those printed by another cartridge in the printer.

Cartridge-to-cartridge alignment has been eliminated in some printers with the use of a single multi-color ink cartridge having a printhead employing three sets of orifices arranged in a group and receiving one color of ink for each group on the printhead. Such a single multi-color print cartridge is inherently self-aligning due to the precise positioning of one set of orifices relative to another on the single orifice plate on the multi-color print cartridge. Even for this cartridge, however, unless other compensation is made, the orifice plate of the printhead should be oriented precisely perpendicular to the direction of travel for accurately printed results.

Mechanical alignment of print cartridges is simple but expensive, requiring precision features created in the orifice plate of the printhead, precision alignment of the cartridges during manufacture to alignment structures or secondary milling of alignment structures or adjustment within the printers cartridge carriage. In each of these foregoing implementations, there are stringent requirements on the printer and the cartridge carriage for either precision during manufacture and long term stability, or complex adjustability and human intervention. Electronic alignment typically requires printing ink droplet dots on a separate region of the medium, scanning the medium with a detector for these dots, then establishing time delays within the printer to compensate for the measured offsets. Again, printer complexity or human intervention and judgment are required to optimize this form of alignment.

Each of the foregoing techniques do not dynamically compensate for movement of the print cartridge within the carriage between alignment cycles due to thermal expansion or wear or loosening within the mechanism. Each of these methods add mechanical or electronic complexity to the printer. Thus, a need exists for a method and apparatus which readily adjusts for horizontal cartridge-to-cartridge alignment errors in a multiple cartridge printer. Furthermore, vertical and rotational offsets also need compensation to precisely align the ink droplets on the media.

SUMMARY OF THE INVENTION

A printer employs a method and apparatus for dynamically compensating misalignment of a printhead employing an ink drop ejection apparatus to expel ink in a controlled manner to effect printing in a printer having a referencing mechanism. Upon determining a need for a first alignment cycle, the printer moves the printhead at a known speed past at least two reference indicia having a predetermined spacing. The passing of a first of the at least two reference indicia and the passing of a second of the at least two reference indicia is detected. The period of time between the detection of the first reference indicia passage and the detection of the second reference indicia passage is measured and a delay time, related to the measured period of time, is created. The energization of at least a portion of an ink drop ejection apparatus is consequently delayed for the duration of the delay time until a second alignment cycle is needed.

DETAILED DESCRIPTION OF THE PREFERRED EMBODIMENT

The present invention encompasses a method and apparatus for self-aligning one or more print cartridges in a dynamic fashion in a printer. An alignment pattern having a large light-to-dark ratio is placed at a functional location within the printer but away from the medium. Photosensitive devices, created as part of the semiconductor substrate and associated with the orifice plate, are arranged to read the high contrast features of the alignment plate. Timing is derived from a clocking pulse and an alignment pulse provided by the printer to time the printheads location relative to the alignment feature on the printer. Firing of the heater resistors are then delayed or advanced as determined by the timing and is implemented by the shift registers constructed, in the preferred embodiment, on the semiconductor substrate of the printhead.

Figure 1:
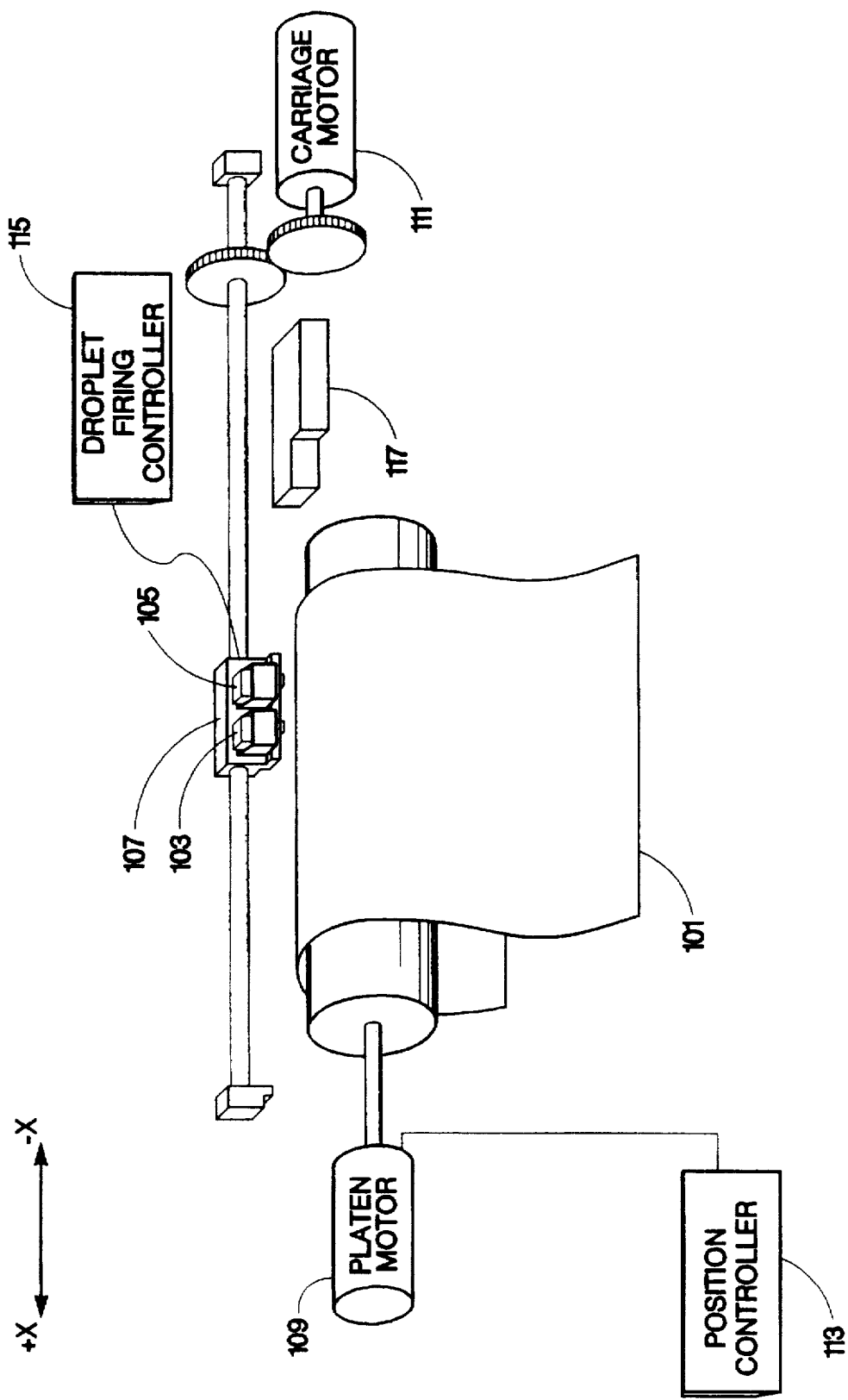
FIG. 1 is a simplified diagram of a printer which may employ the present invention.

A simplified diagram of a printer is shown in FIG. 1. Medium 101 is moved past print cartridges 103 and 105 in a direction arbitrarily designated the "Y" direction (into the plane of paper of FIG. 1) by a platen motor 109. The print cartridges 103 and 105 are mounted in a cartridge carrier 107 and are scanned back and forth across the medium in an orthogonal ("X") direction by a carriage motor 111. The platen motor 109 and the carriage motor 111 are conventionally under the control of a media and cartridge position controller 113 such positioning and control apparatus are known and are further described in U.S. Pat. No. 5,070,410. Thus the medium is positioned in a location so that the print cartridges 103 and 105 may eject droplets of ink as required by the data which is input to the droplet firing controller 115 of the printer in a band parallel to the "X" direction as the print cartridges 103 and 105 are scanned across the medium by the carriage motor 111. When the print cartridge 103 and 105 reach the end of their travel at an edge of the medium 101, the medium 101 typically is incrementally advanced by the media position control 113 and platen motor 109, and the print cartridge 103 and 105 are returned along the "X" axis while printing another band of ink droplet dots on the medium 101 until the opposite end of the medium is reached. From time to time, the print cartridges 103 and 105 may be moved away from the medium 101 and aligned with a service station 117 so that the printheads of the cartridges 103, 105 may be wiped clean of debris and the orifices purged of any material which may obstruct the ejection of ink droplets. A service station which may be employed in the preferred embodiment of the present invention is further described in U.S. Pat. No. 5,103,244. In the present invention, an alignment reference indicia is located on the service station 117 to provide a location reference for each of the print cartridges 103 and 105.

Figure 2:
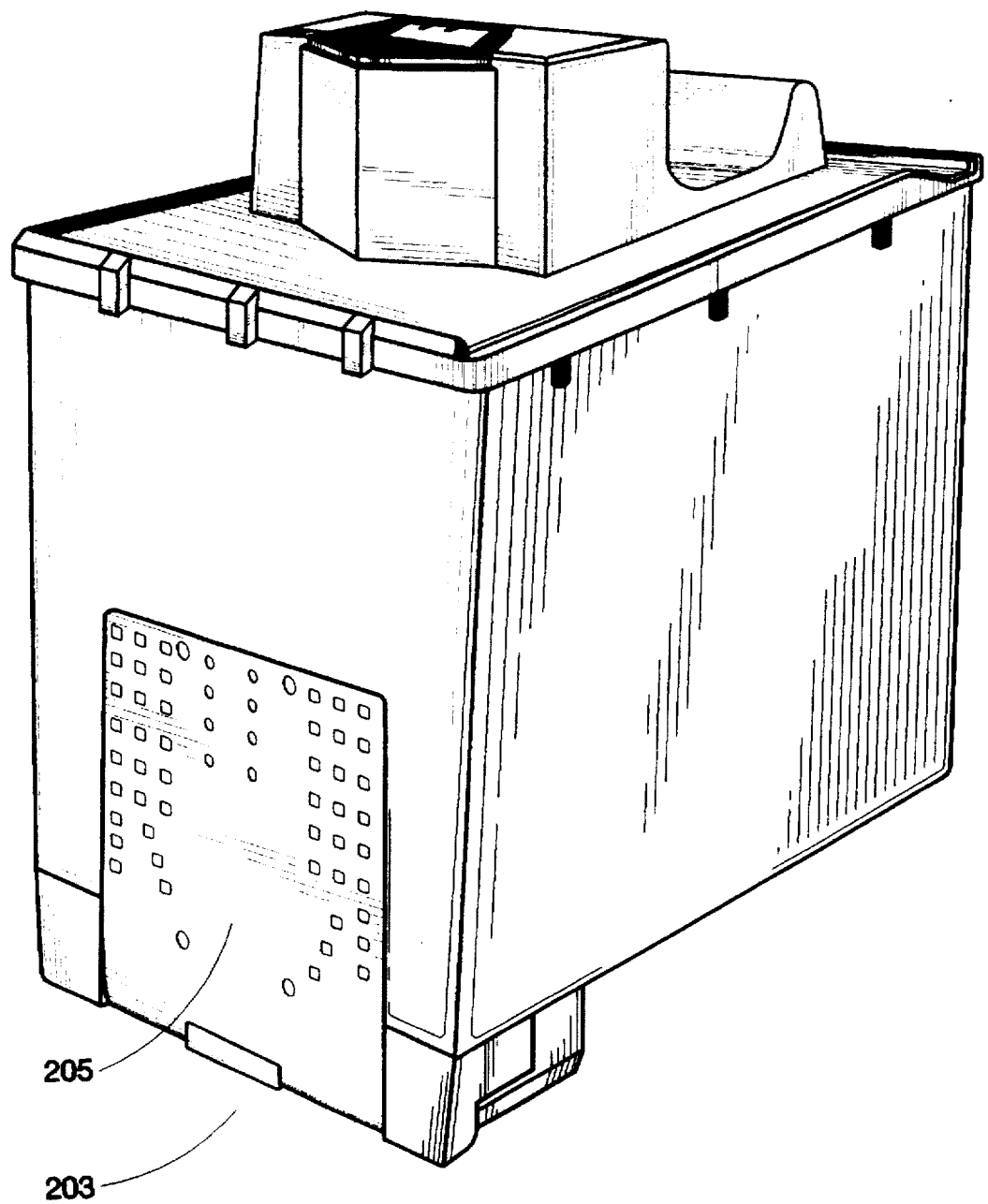
FIG. 2 is an isometric view of a print cartridge which may be used in the printer of FIG. 1 and which may employ the present invention.
Figure 3:
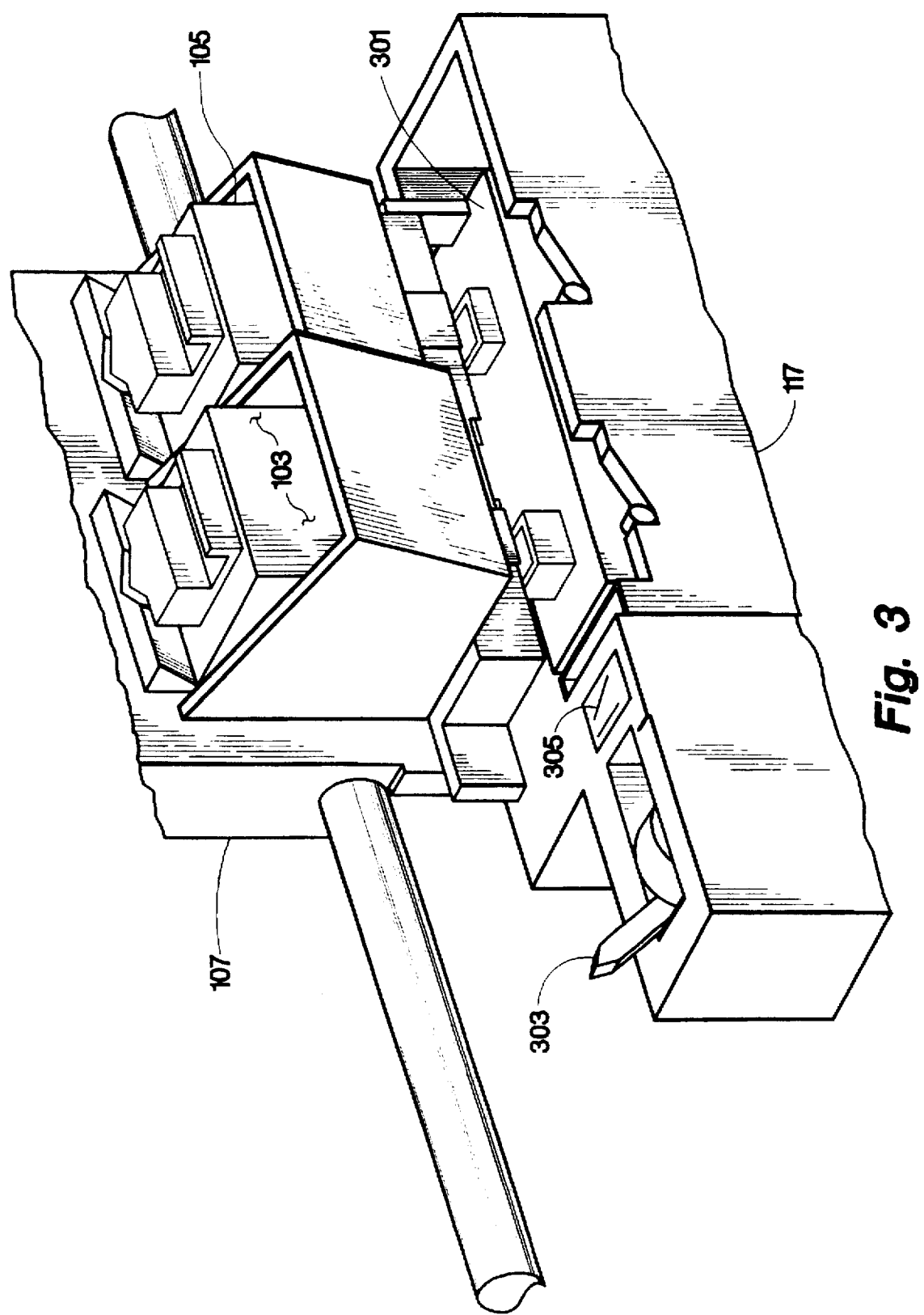
FIG. 3 is an isometric view of a print cartridge carriage for the printer of FIG. 1 and print cartridges of FIG. 2 and which may employ the present invention.

A print cartridge which may be used in the present invention is shown in FIG. 2. Generally, a majority of the volume of the print cartridge is dedicated to the containment of ink. At one end of the cartridge a printhead 203 is affixed to the print cartridge and internally coupled to the ink supply within the ink cartridge. Electrical connections are made to the heater resistors within the printhead 203 by a flexible circuit 205. The flexible circuit 205 also mates with associated electrical connectors of the print carriage of the printer. When a plurality of print cartridges are mounted in a printer, they are arranged in a side-by-side carriage configuration for the preferred embodiment as shown in FIG. 3. Electrical connection to the print cartridges are made via mating connectors (not shown) disposed on the print carriage 107. The printhead of each cartridge is typically oriented down relative to the direction of gravity and positioned over the media upon which ink is to be printed. The service station 117 is also shown in greater detail with the print cartridges 107, 105 positioned over a portion 301 of the service station 117 which caps the printheads and prevents ink from drying in the orifices when positioned in contact with the printheads. A wiper mechanism 303 is arranged in a direction from the capping mechanism such that when the print carriage returns from the medium being printed, the printheads are first wiped by the wiper mechanism 303 and then capped by the capping portion 301. It is a feature of the present invention that an alignment plate 305 be disposed within the fixed portion of the printer and that, in the preferred embodiment, the alignment plate 305 is placed on the service station. The service station also provides power for the light source (not shown) beneath the alignment plate 305.

Figure 4:
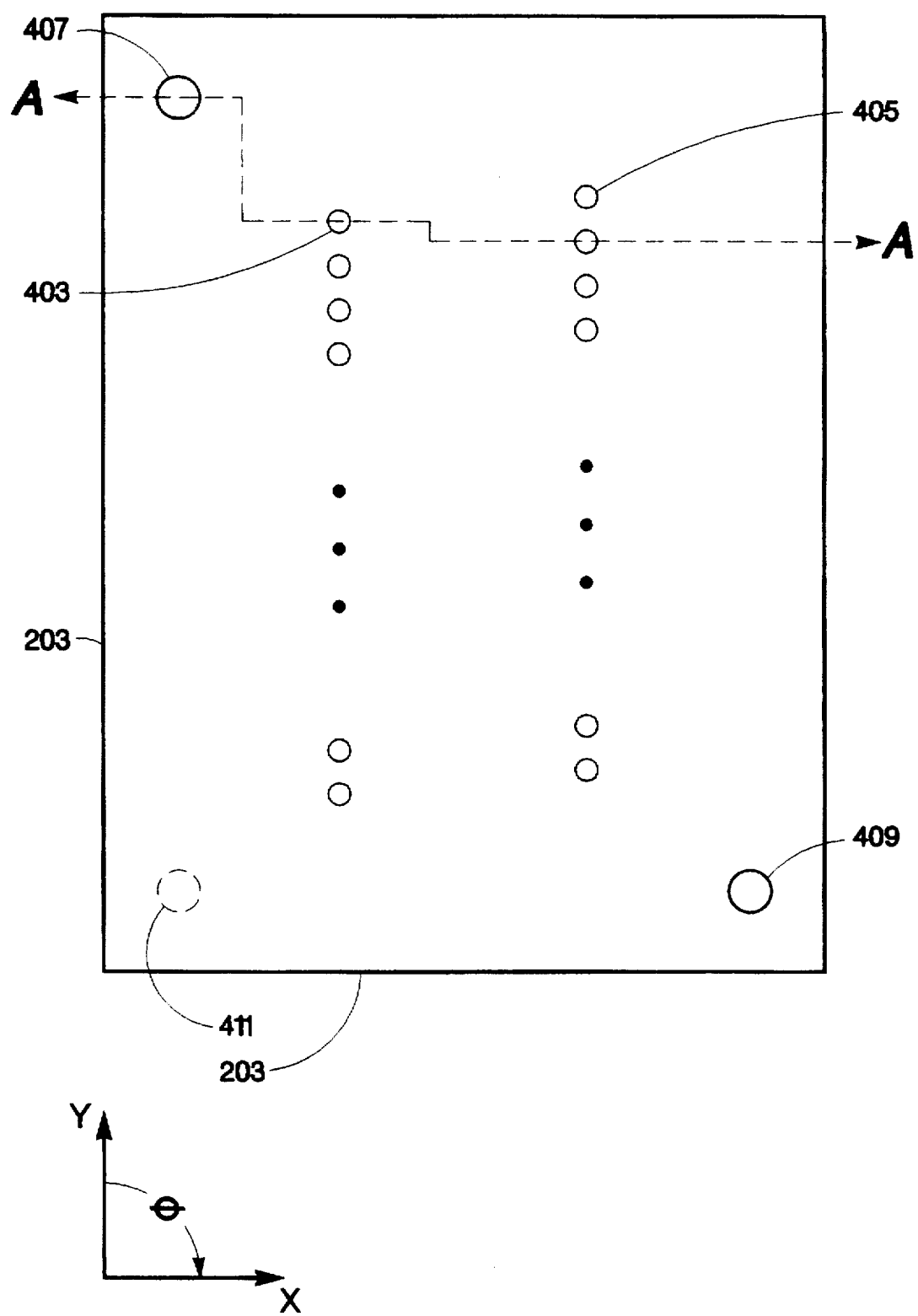
FIG. 4 is a planar view of a printhead for a print cartridge which may employ the present invention.

A magnified planar view of the printhead is shown in FIG. 4. A plurality of orifices in two columns 403, 405 are depicted in the orifice plate of the printhead 203. Although shown in two collinear columns, the orifices may be staggered in the +X or −X direction from the general line of each column. Such stagger amount is known and electronically compensated for within the control of the printer. In the preferred embodiment, a total of 54 orifices are employed in equal division in the two columns of the orifice plate. At separate points of the orifice plate but created by the same process which creates each orifice, two alignment apertures 407 and 409 are found in the orifice plate of the printhead 203. In the preferred embodiment alignment aperture 407 and alignment aperture 409 are placed diagonally across the surface of the orifice plate as shown. Alternatively, an alignment aperture 411 may be placed on an imaginary line with aperture 407 which is parallel to the "Y" direction.

Figure 5:
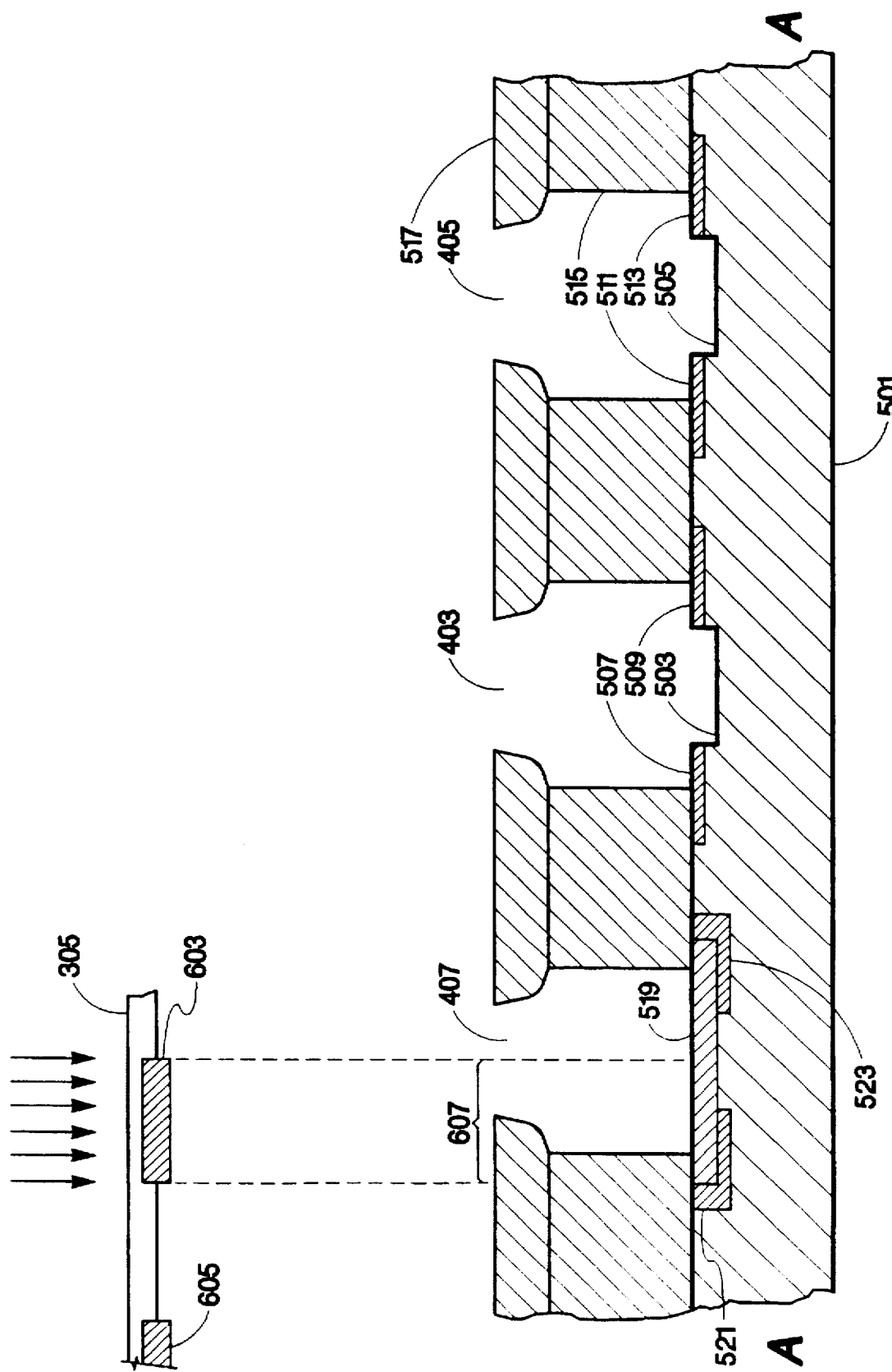
FIG. 5 is a cross sectioned view of the printhead of FIG. 4 along section A—A.

A cross section of the printhead 203 along the section line AA is shown in FIG. 5. Features relating to structure which supports the filling of ink have been deleted from FIG. 5 for clarity. A semiconductor substrate 501 is conventionally processed to include heater resistors 503 and 505 which are appropriately connected by electrical connectors 507, 509, 511, and 513. Ink firing chambers, which in operation are filled with ink, are defined by the substrate, the barrier layer material 515, and orifice plate 517. The orifice plate 517 overlays the barrier material 515 such that the orifices 403 and 405 are arranged in association with the heater resistors 503 and 505 and the formed ink firing chambers. As part of the processing steps of the semiconductor material 501 for the preferred embodiment, a photosensitive area 519 is created using conventional photolithographically defined semiconductor processes. This photosensitive area 519 is then connected by way of conductors 521 and 523 to appropriate parts in the electronic circuit to be described later. The alignment aperture 407 is positioned relative to photosensitive area 519 such that light falling perpendicularly to the surface of the orifice plate will fall on the photosensitive area 519. It is a feature of the present invention that the alignment aperture 407 is produced in the same process as the ink firing orifices 403 and 405 thereby providing nearly perfect registration between the orifices and the alignment orifice. Furthermore, since firing resistors 503, 505, and photosensitive area 519 are all produced by precision semiconductor photolithographic techniques, they too, are precisely aligned.

Figure 6:
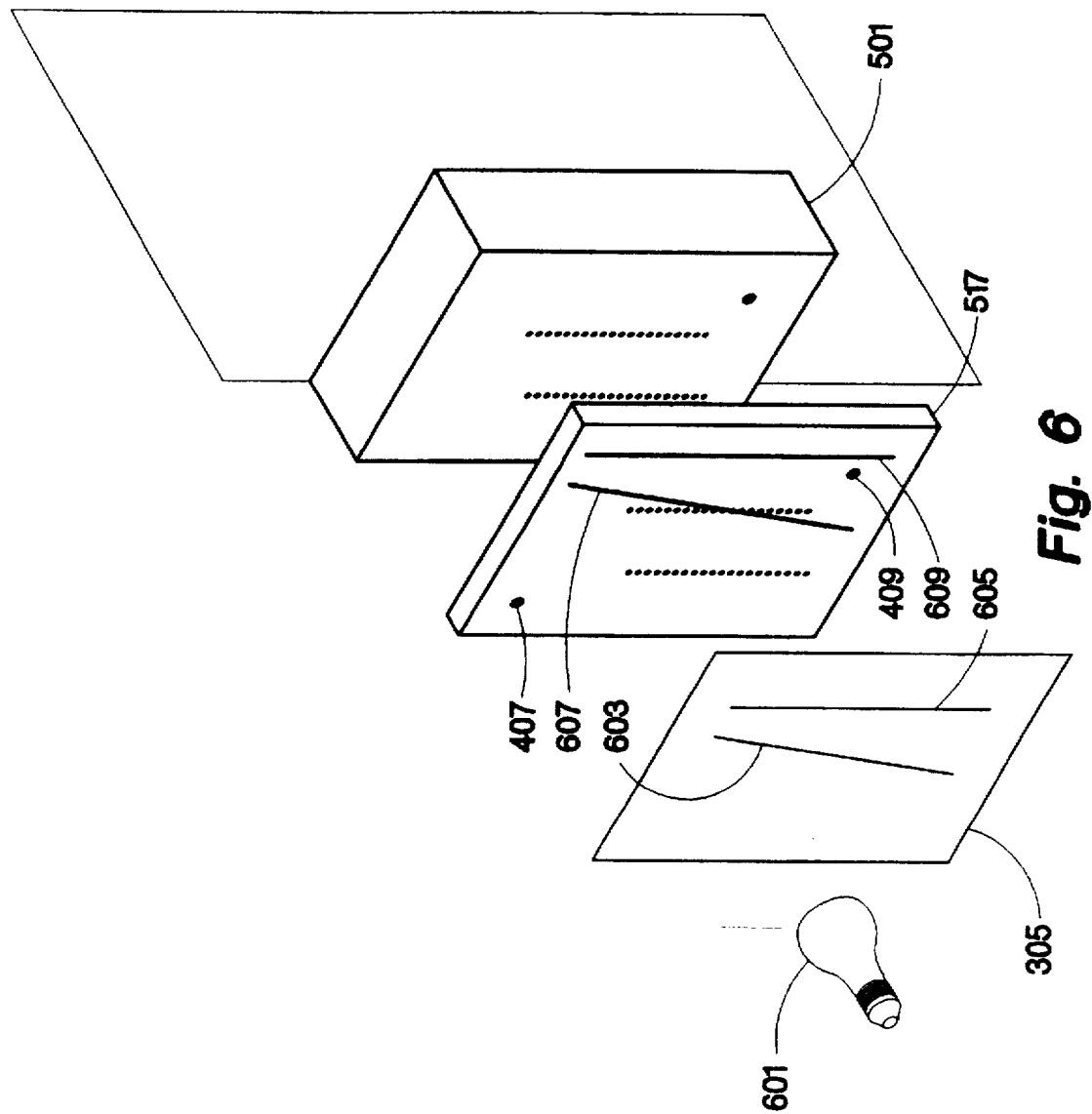
FIG. 6 is a simplified view of the orientation of the substrate, orifice plate, and alignment plate which may be employed in the present invention.

Alignment and operation of the alignment plate 305 and the printhead can be apprehended from the drawing of FIG. 6. The service station 117 of FIG. 3 has been omitted for clarity, leaving only the alignment plate 305 to illustrate the alignment technique employed in the preferred embodiment. A light source 601 is disposed within the service station 117 and arranged in a fashion such that the light falls perpendicular to the plane of the alignment plate 305. In the preferred embodiment, this is accomplished by using a conventional lensed light emitting diode but any source of essentially parallel light rays may be employed without departing from the spirit of the present invention.

Two opaque stripes 603 and 605 are formed in the light transmitting (translucent or transparent) alignment plate 305 and cause respective shadows 607, 609 to fall upon the orifice plate 517 of the printhead. In the preferred embodiment, the alignment plate 305 is made of a conventional, optically translucent plastic having stripes 603 and 605 conventionally etched and printed into the surface of the alignment plate plastic in such a manner that the width of the stripes is at least as wide as the diameter of an alignment aperture. As the orifice plate 517 passes in front of the alignment plate 305 during a trip to the service station or as otherwise required, the shadows 607, 609 pass over the alignment orifices 407, 409. As illustrated in FIG. 5, the shadow 607 occludes the light falling upon photosensitive area 519 thereby generating an electrical signal which will be described later. In the preferred embodiment, the spacing between the alignment plate 305 of the service station 117 and the orifice plate 517 is 2 mm but this spacing is not critical as long as the light emanating through the alignment plate is parallel.

In an alternative embodiment, the alignment plate 305 may be made opaque with transparent slits to emit light. In either embodiment, the presence and/or absence of light passing through apertures in the orifice plate and falling upon photo receptors in the printhead is used to indicate location of the printhead.

Figure 7:
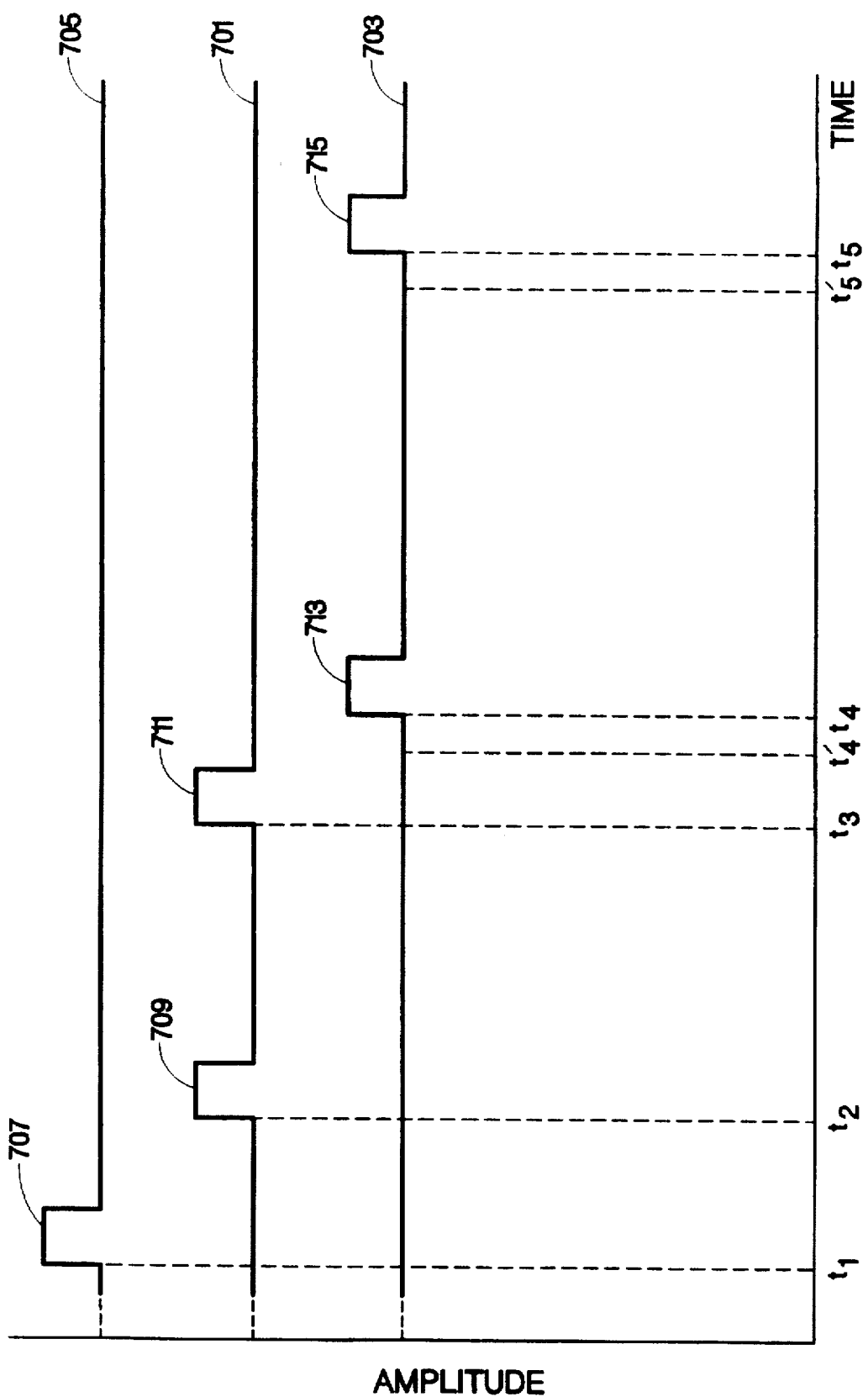
FIG. 7 is a timing diagram of electrical signals which may be produced by the printhead of FIG. 6.

After the photoreceptor signal is processed and shaped, electrical signals generated by the photosensitive areas are shown in the timing diagram of FIG. 7. The electrical output signal from the photosensitive area beneath the alignment orifice 407 is illustrated as output 701 and the electrical output signal from the photosensitive area beneath the alignment orifice 409 is illustrated as output 703. In the preferred embodiment, the printer provides a reference indicia synchronizing signal 705 which is used to indicate a previously established index position of the cartridge carrier 107 relative to the printer. This signal may be generated in a number of conventional ways; in the preferred embodiment, as the cartridge carrier passes a preselected position on the printer, an electrical reference pulse 707 is generated by the position controller 113. As illustrated in FIG. 7, the pulse 707 occurs at time $t_1$. As the alignment orifice 407 of the first cartridge is moved past opaque strip 605, the light falling upon the photosensitive area 519 is interrupted as the opaque strip 605 is passed and an electrical signal, represented by pulse 709 in FIG. 7, is generated. Pulse 709 is designated as occurring at time $t_2$. As the first print cartridge continues to move, opaque strip 603 throws a shadow across alignment orifice 407 and the photosensitive area 519 and an electrical signal, represented by pulse 711 in FIG. 7, is generated and this pulse is designated as occurring at time $t_3$. Evaluation of the difference in time between $t_1$ and $t_2$ yields an offset or position error ("X") indication for the cartridge relative to the index position. Since the opaque strip 603 is oriented at an angle relative to opaque strip 605 evaluation of the difference in time between $t_3$ and $t_2$ from an expected time (related to the translation speed of the print cartridge, in the preferred embodiment 32 cm/sec, and the distance between the opaque strips 603 and 605 at the correct "Y" elevation of the print cartridge) yields an indication of a position error in the "Y" direction. In the preferred embodiment, $t_3-t_2=10$ msec, but the absolute time is not a critical parameter in practicing the invention so long as it is a consistent time difference.

Referring now to the output signal 703, it can be seen that pulses 713 and 715, similar to pulses 709 and 711, are generated by the photosensitive area associated with alignment aperture 409. Since the opaque strips 603 and 605 are further apart at the lower end of the printhead than they are at the upper end of the printhead, the leading edges of pulses 713 and 715 (at times $t_4$ and $t_5$, respectively) are further apart in time ($t_5-t_4$) than the pulses 709 and 711. If the print cartridge has a rotational ($\theta$) error in its orientation relative to the printer there is at least a difference in the detected time of pulses 709 and 713. For example, if the expected leading edge time for pulses 709 and 713 to occur were $t_2$ and $t_4$, but the actual time detected for pulse 713 occurred at a later time, $t_4$, the print cartridge has a rotational position error in the $-\theta$ direction. Likewise if the actual pulse 713 time detection preceded the expected time, the print cartridge has a rotational position in the $+\theta$ direction. In a two-or multi-print cartridge printer, each of the print cartridges would undergo the preceding measurement of position error relative to a fixed reference position on the printer.

Figure 8:
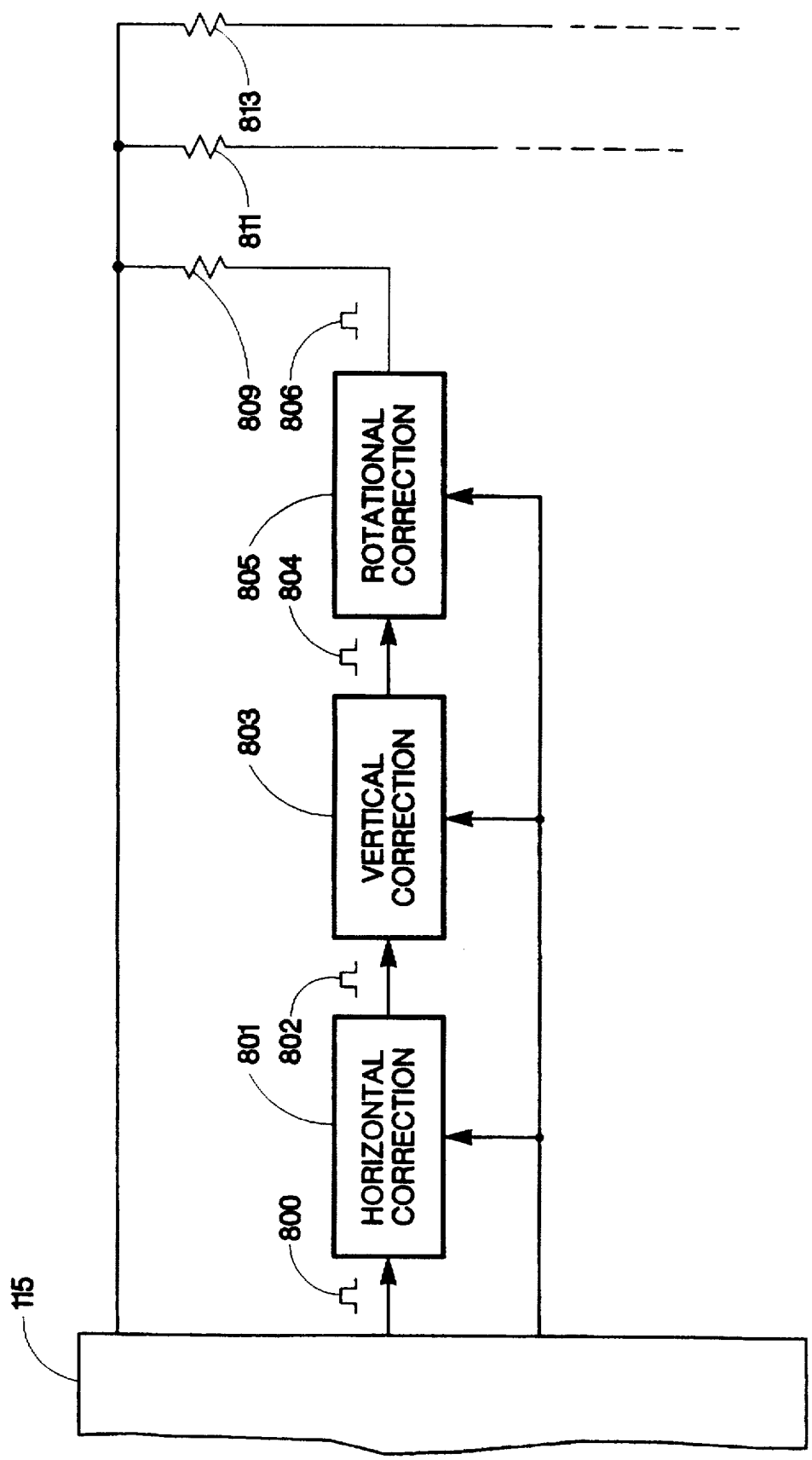
FIG. 8 is a schematic diagram of the connection of horizontal, vertical, and rotational correction circuits which may be employed in the present invention.

In the preferred embodiment, correction of horizontal, vertical, and rotational position errors of the cartridge is made by sequentially adding an appropriate delay in a heater resistor firing pulse output from the droplet firing controller 115. This process can be perceived from the block diagram of FIG. 8. A pulse 800 of electric energy is output from droplet firing controller 115 and applied to a horizontal position correction circuit 801 for delay, if necessary. The delayed (if needed) firing pulse 802 is coupled to a vertical position correction circuit 803 for delay if necessary for correction of a vertical position error.

The delayed (if needed) firing pulse 804 is coupled to a rotational error correction circuit 805 for appropriate delay to correct for rotational errors. A final heater resistor firing pulse 806 is then output to the heater resistor 809 to energize the resistor, heat and vaporize the ink, and expel a droplet of ink for printing on the medium. For each of the firing resistors there exists a similar serial correction circuit for each positional error, that is, for heater resistor 811, a horizontal, vertical, and rotational position correction circuit is available to modify the timing of the firing pulse output from droplet firing controller 115. Likewise for heater resistor 813, similar circuits exist. While the preferred embodiment utilizes the correction circuits as shown, it is obvious that the circuits could be repositioned in their sequence of modifying the firing pulse or that a multiple-purpose circuit could undertake dual or triplicate functions. In some instances, especially when a mechanical alignment negates the need for one of the electronic corrections described herein, one or more of the correction circuits may be deleted.

Figure 9:
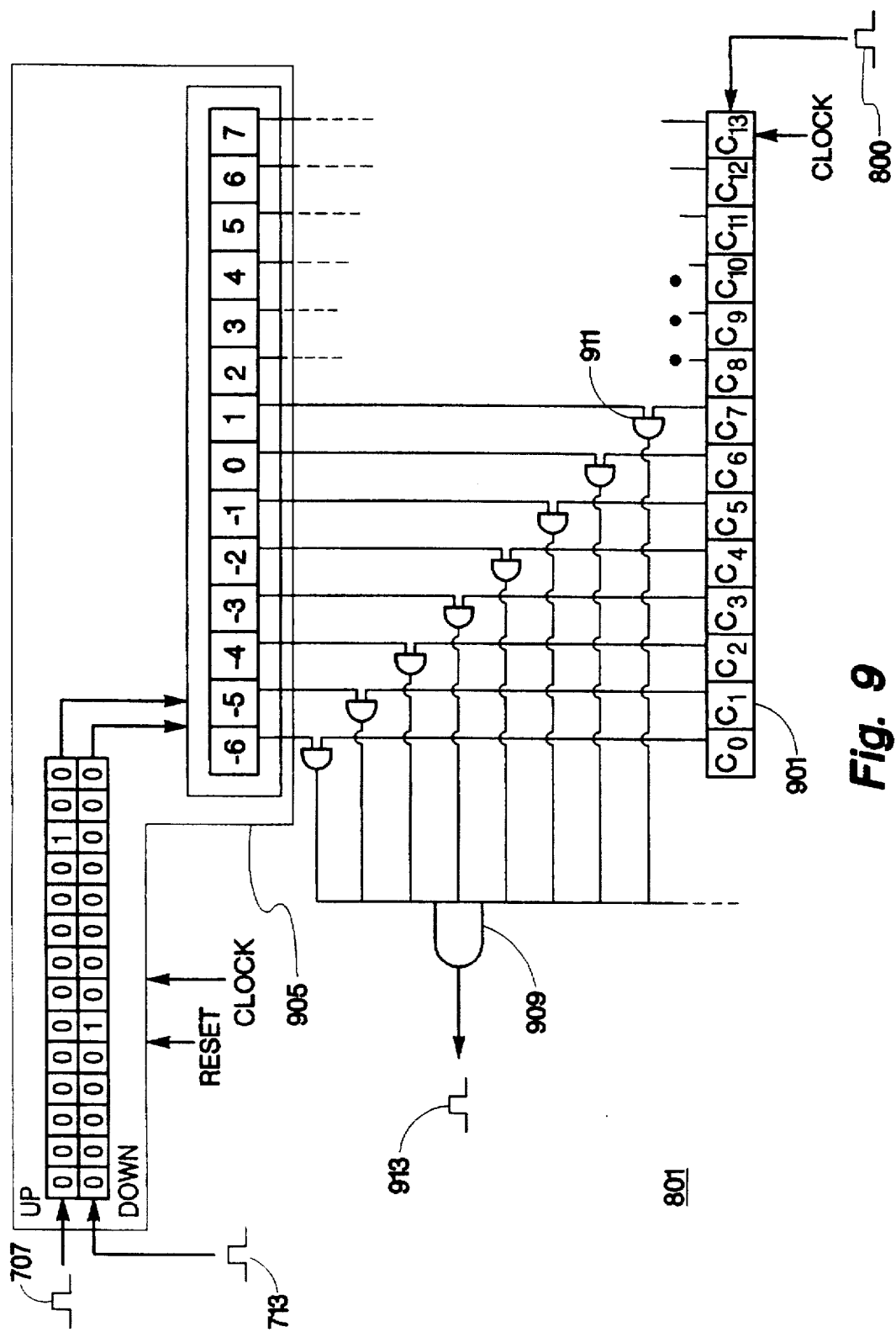
FIG. 9 is a schematic diagram of a horizontal error correction circuit which may be employed in the present invention.

A detailed schematic of the horizontal correction circuit 801 is shown in FIG. 9. A delay in the pulse 913, which is eventually coupled to a firing resistor, is introduced by establishing a pick-off point (an incremental delay) along a shift register 901. A firing pulse 800 generated by the droplet firing controller 115 is coupled to the shift register 901 and is conventionally clocked to each register of the shift register in turn. The print cartridge receives a reference pulse 707 from the position controller 113 as described relative to FIG. 7. This pulse is coupled to the "start up/stop" input port of the up/down counter −1 of 14 line selector 905 to commence the count and shift a bit in the register of the 1 of 14 line selector. Pulse 713 generated when the shadow of opaque stripe 605 occludes the aperture 409, is coupled to the "start down/stop" input port of the up/down counter of 905 and places a counter stop after a number of clock pulses have been applied to the up/down counter −1 of 14 line selector 905. This results in a bit being set in the 1 of 14 line selector corresponding to the time delay between time $t_1$ and $t_4$. When the firing pulse input into the shift register corresponds with the selected line, an "and" gate, for example "and" gate 911, has both inputs active and couples a pulse to gate 909 for coupling of a delayed firing pulse 913 out of the horizontal correction circuit. It is expected that the pulse 713 will lag the pulse 707 by a predetermined number of clock pulses. If pulse 713 occurs too soon or too late, the delay is changed to accommodate the error and compensate for the horizontal misalignment. Each cartridge in the cooperatively printing set thus has its delay offset so that all produce printed ink droplets at precisely the correct time relative to its true position in the print cartridge carriage. In this way horizontal ("X") alignment between the individual cartridges is established with a high degree of precision.

Similarly vertical offset is established by detecting the timing of vertically differentiable reference indicia. The objective is to select the best contiguous set of orifices to be used to print a character or image. In the preferred embodiment where fifty orifices are used to print, fifty-four orifices are actually available. With a perfect vertical alignment, the top and bottom two orifices will remain unused while the centered fifty are selected for printing. If the print cartridge is positioned low relative to nominal, the top one orifice and bottom three orifices will remain unused while the fifty orifices between will become the selected set.

Figure 10:
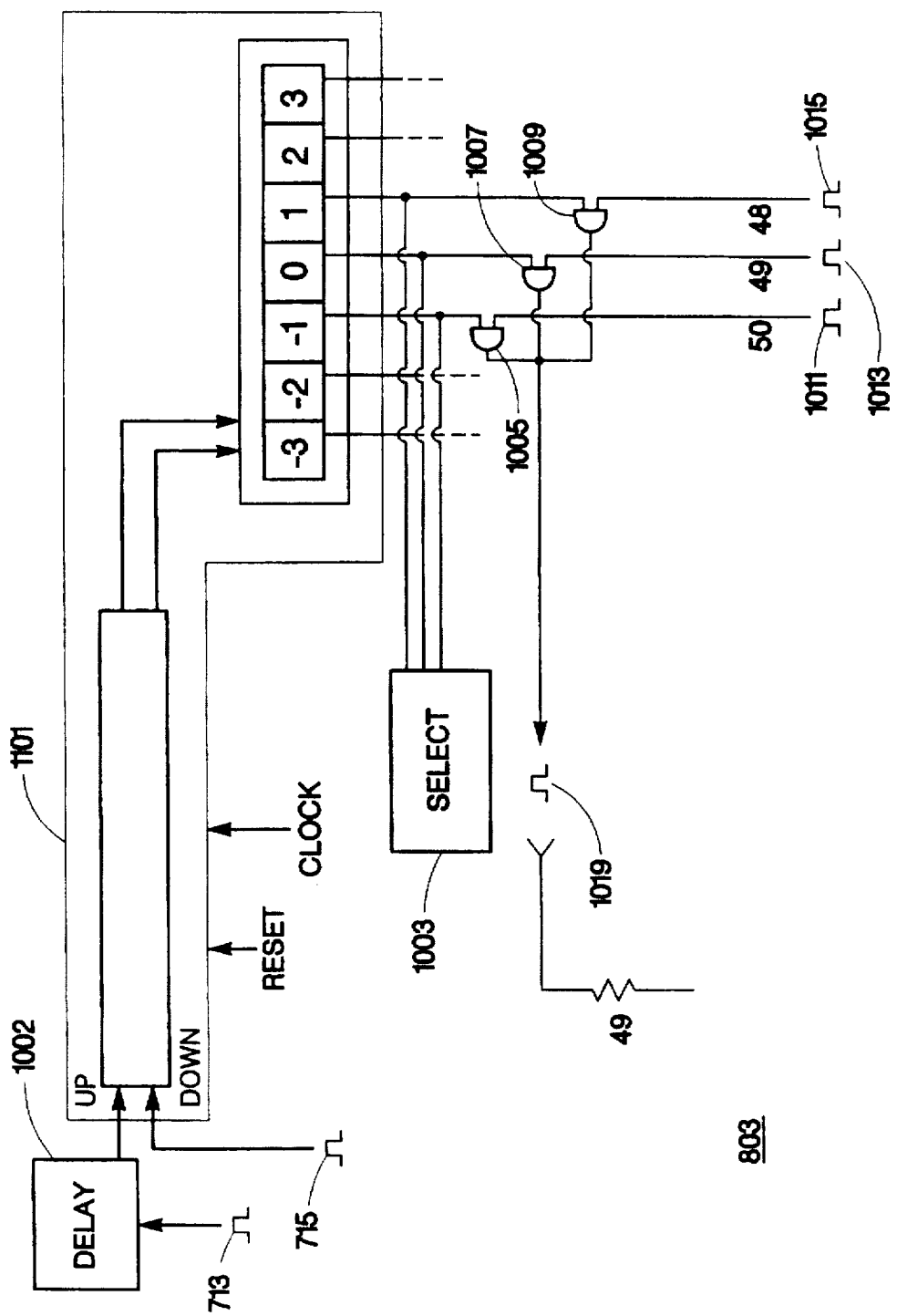
FIG. 10 is a schematic diagram of a vertical error correction circuit which may be employed in the present invention.

Referring now to FIG. 10, a more detailed schematic of the vertical correction circuit 803 is shown. Pulses 713 and 715, generated as the shadows of opaque stripes 605 and 603 sequentially occlude aperture 409, are coupled to an up/down counter −1 of 8 line selector 1001. Pulse 713 is first delayed by a predetermined time corresponding to the expected time delay between $t_1$ and $t_4$ and then applied to the "start up/stop" port of the up/down counter and pulse 715 is applied to the "start down/stop" port of the up down counter. If pulses 713 and 715 are not essentially coincident after 713 is delayed by delay 1002, a line other than the line corresponding to a zero firing pulse delay is selected in the 1 of 8 line selector. A 1 of 7 line selection may be made by selector 1003. When the line select is made, for example a selection of a line corresponding to a delay of −1 clock cycle, register −1 is the line selected. The state of register −1 is coupled to one input of an "and" gate 1005. The other input is coupled to the firing pulse designated for the heater resistor corresponding to orifice number (for example) 50. The register corresponding to no delay is coupled to "and" gate 1007 as is the firing pulse designated for the heater resistor corresponding to orifice number 49; the register corresponding to a delay of +1 clock cycle is coupled to "and" gate 1009 as is the firing pulse designated for the heater resistor corresponding to orifice number 48. Thus when a firing pulse 1011, destined for the heater resistor of orifice number 50, is input, it is converted to a firing pulse 1019 directed to the heater resistor of orifice number 49. The result is that the pulses for each resistor are electronically redirected to the firing resistor physically located one orifice beneath the originally selected orifice. An error in the vertical direction is thus compensated. A plurality of "and" gates are similarly connected as shown so that each resistor may have electronically redirected firing pulses as required.

Figure 11:
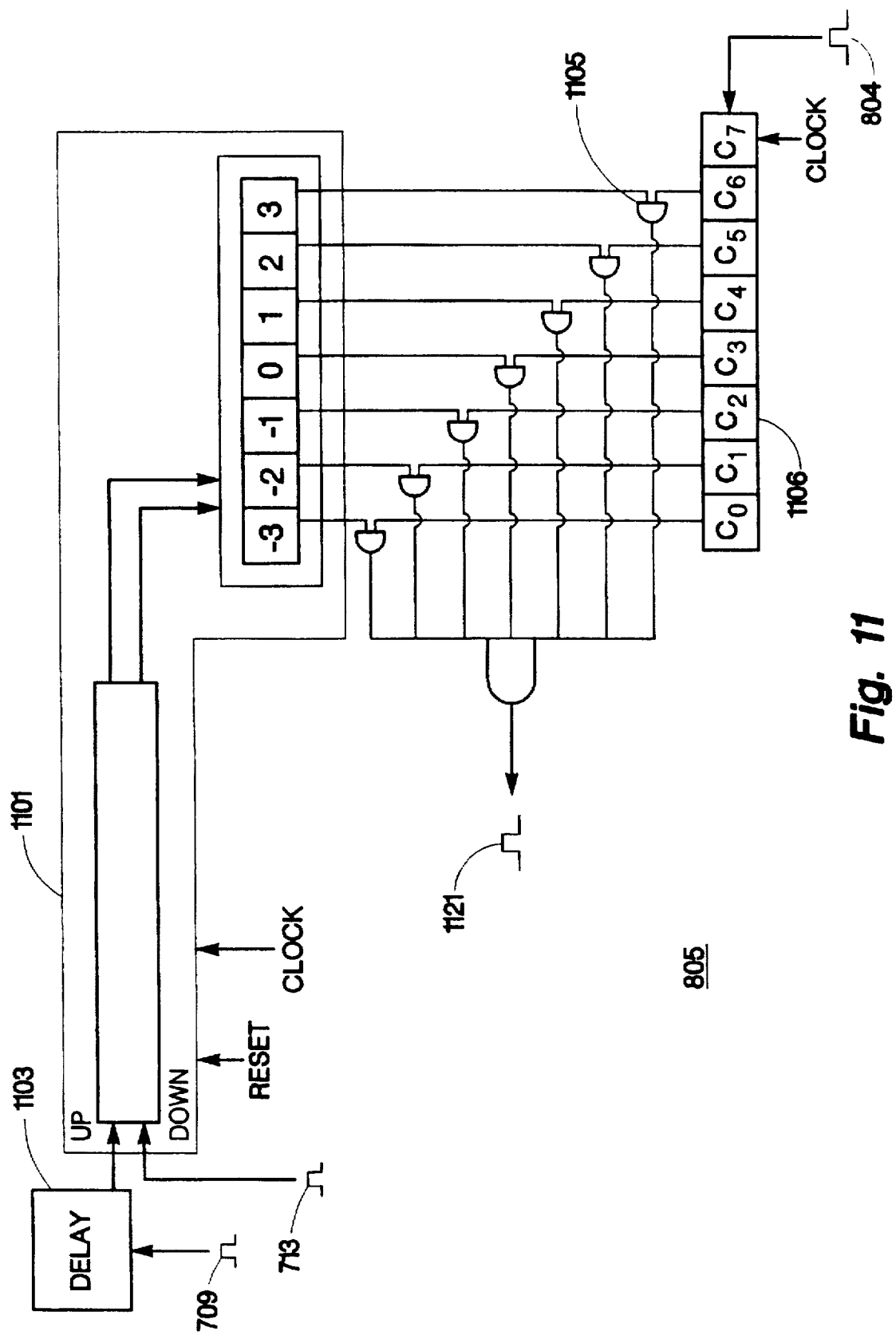
FIG. 11 is a schematic diagram of a rotational error correction circuit which may be employed in the present invention for heater resistors which are associated with orifices furthest from a rotational datum.

Rotational miss-alignment, that is, a miss-alignment in the θ direction, requires that there be two detection orifices and photosensitive features on the printhead of the cartridge. Assuming the leading detection reference indicia (relative to cartridge movement during alignment) on the printhead face is the feature used to establish horizontal alignment, a lagging detection feature is then used to establish degree of cartridge orifice rotation. The rotational correction circuit 805 of the preferred embodiment is based upon knowing the intended horizontal separation of the two detection features. A 1 of 8 lineselector-up/down pulse counter 1101, as shown in FIG. 11, is started when the first alignment pulse 709 (from the photosensitive area associated with alignment orifice 407) is input to the "start up/stop" input to start the pulse counter after being delayed by delay 1103 for the expected delay time $t_4-t_2$. The counter is stopped when the second alignment pulse 713 (from the photosensitive area associated with alignment orifice 409 produced by the same vertically extended reference indicia) is coupled to the "start down/stop" input of the counter. Since the datum in the preferred embodiment is established at the alignment aperture 409, rotational errors are defined as rotation about this datum. Orifices which are disposed furthest from the datum experience the greatest amount of deviation from the desired position; orifices disposed closest to the datum experience the least amount of deviation. Also, the most troublesome deviation occurs in the vertical direction rather than in the horizontal. Accordingly, the implementation in the preferred embodiment selectively corrects the vertical deviation. Those heater resistors associated with orifices furthest from the datum orifice are caused to experience a correction in the vertical direction while those closest to the datum are not. The line select is determined by the difference between the delayed pulse 709 and the pulse 713. As shown for the preferred embodiment in FIG. 11, the line select is set by the time difference in pulses 709 and 713. The state of the line select is anded with the input pulse 804 which is clocked through the shift register 1106 so that, for the heater resistors corresponding to the orifices furthest away from the datum, when the pulse 804 reaches the register which is coupled to the "and" gate (for example, "and" gate 1105) which is connected to the line select with the active state, a heater resistor firing pulse 1121 is applied to the heater resistor.

Figure 12:
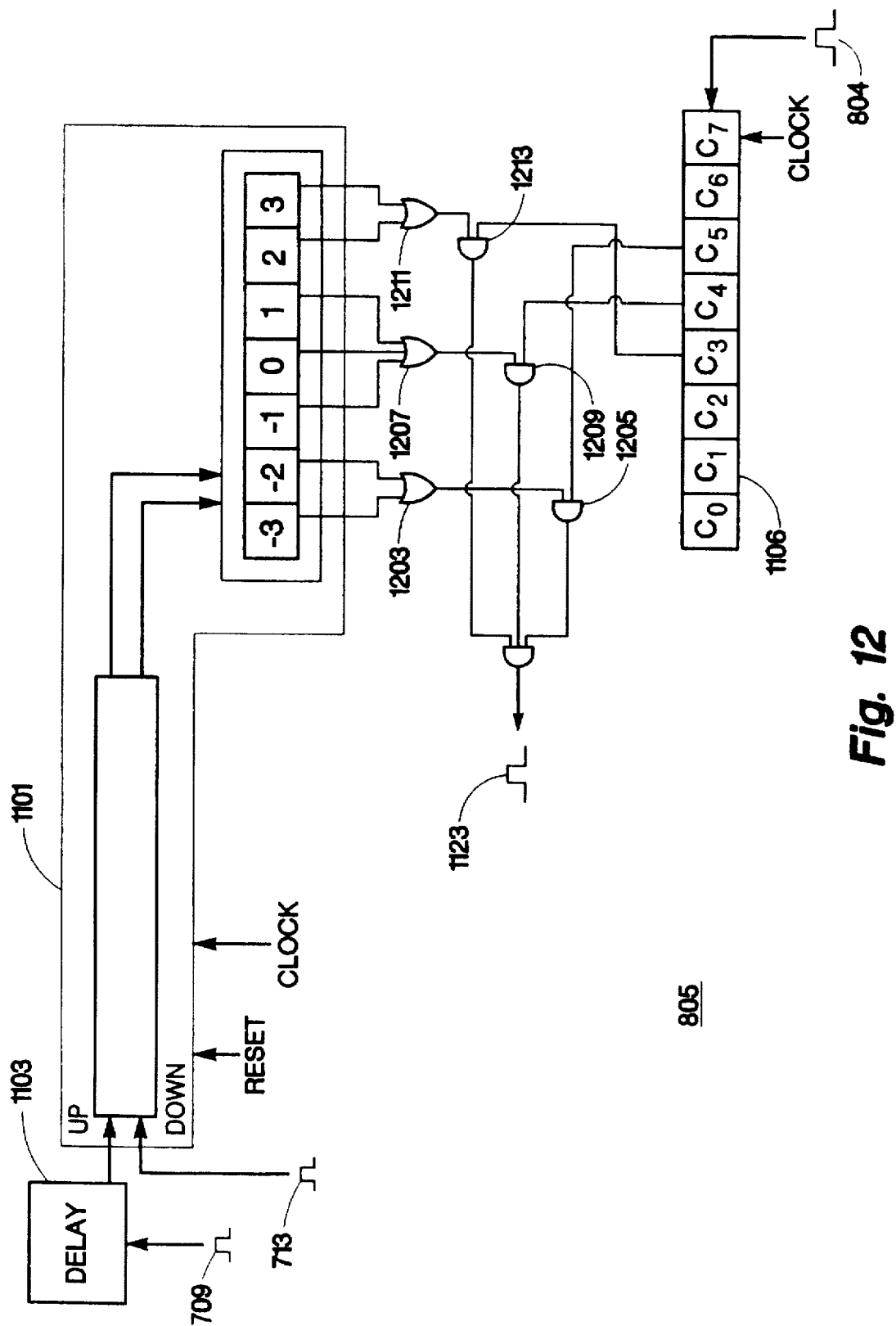
FIG. 12 is a schematic diagram of a rotational error correction circuit which may be employed in the present invention for heater resistors which are associated with orifices of intermediate distance from the rotational datum.

For those heater resistors which are associated with orifices closer to the datum, the amount of time delay allowed is compressed by coupling two or more of the line select registers together with an "or" gate. This is shown in the schematic of FIG. 12. In the preferred embodiment, line select registers corresponding to time increments of −3 and −2 clock pulses are coupled to an "or" gate 1203 and then to an "and" gate 1205. For line select registers corresponding to −1, 0, and +1 clock pulse delays, the line select register outputs are coupled to an "or" gate 1207 and then to "and" gate 1209. For line select registers corresponding to +1 and +2 clock pulse delays, the line select register outputs are coupled to an "or" gate 1211 and then to "and" gate 1213. In this way, a pulse 804 input to the heater resistors of orifices of intermediate distance from the datum is output as a time shifted pulse 1123 with a compressed amount of time shifting. Heater resistors closest to the datum are not shifted in time to correct for rotational errors in the positioning of the print cartridge.

In an alternative embodiment a more sophisticated mapping scheme can compensate vertical as well as rotational errors. Also, if the cartridge is capable of printing gray scale, a gray scale level adjustment could be made at this time. Furthermore, a more sophisticated rotation correction scheme would compensate for uniform change in orifice plate size due to manufacturing tolerance or change in temperature. In this alternative, the distance between the two detectors on the printhead face is essentially measured by using both the horizontal and vertical crossing timing information. This information is ratioed with the horizontal offset to produce a better estimate of θ error and therefore a more robust rotation correction, independent of uniform orifice size changes.

Alignment of the cartridge in the preferred embodiment is keyed to the conventional servicing cycle of the print cartridges in a printer. A alignment cycle would also be run at printer turn on. Alternative alignment algorithms for the cartridges could take place as often as once per printing pass just prior to beginning the print swath. Also a detection of a change printhead temperature, a new page, or simply the passage of time or number of print swaths completed could also be used to determine when to perform an alignment cycle.

What is claimed is:

1. A method for dynamically compensating misalignment of a printhead employing an ink drop ejection apparatus to expel ink in a controlled manner to effect printing in a printer having an alignment mechanism, comprising the steps of:

determining a need for a first alignment cycle;

moving the printhead at a known speed and direction past the alignment mechanism which comprises at least two spaced apart reference indicia;

detecting said passing of a first of said at least two reference indicia with a first detector disposed in the printhead;

detecting said passing of a second of said at least two reference indicia with said first detector;

measuring a period of time between said detection of said first reference indicia passage and said detection of said second reference indicia passage;

creating a delay time related to said measured period of time; and delaying energization of at least a portion of the ink drop ejection apparatus for a duration of said created delay time until a second alignment cycle is needed.

2. A method in accordance with the method of claim 1 wherein said step of detecting said passing of said first of said at least two reference indicia further comprises the step of detecting a change in light intensity.

3. A method in accordance with the method of claim 2 wherein said step of detecting a change in light intensity further comprises the step of detecting a change in light intensity from light to dark produced by a source of light occluded by two opaque strips disposed in a light transmitting alignment plate of the printer.

4. A method in accordance with the method of claim 2 wherein said step of detecting a change in light intensity further comprises the step of detecting a change in light intensity from dark to light produced by a source of light emanating from two slits disposed on the printer.

5. A method in accordance with the method of claim 1 wherein said step of detecting said passage of said first of said at least two reference indicia and detecting said passage of said second of said at least two reference indicia further comprises the step of detecting said passage of said second of said at least two reference indicia with a second detector, said first detector and said second detector spaced apart in said printhead whereby horizontal misalignment of the printhead is determined.

6. A method in accordance with the method of claim 1 wherein said step of measuring a period of time further comprises the steps of starting an up/down counter with said detection of said passage of said first of said at least two reference indicia and stopping said up/down counter with said detection of said passing of said second of said at least two reference indicia.

7. A method in accordance with the method of claim 6 wherein said step of creating a delay further comprises the step of selecting a register of a line selector corresponding to the output of said up/down counter.

8. A method in accordance with the method of claim 1 further comprising the steps of:

detecting said passage of said first of said at least two reference indicia with a second detector;

commencing the measurement of a period of time in response to said detection of said passage of said first of said at least two reference indicia with said first detector and ceasing the measurement of said period of time in response to said detection of said passage of said first of said at least two indicia with said second detector;

delaying energization to a second portion of the ink drop ejection apparatus disposed closer to said second detector than to said first detector whereby rotational misalignment of the printhead is compensated.

9. A method in accordance with the method of claim 1 wherein said determining a need step further comprises the step of detecting a printhead servicing cycle.

10. A method in accordance with the method of claim 1 wherein said determining a need step further comprises the step of detecting a printer power turn on.

11. A method in accordance with the method of claim 1 wherein said moving step further comprises spaced apart indicia being separated by not more than a width of the printhead.

12. A printer which dynamically compensates misalignment of a printhead having a printhead width and employing an ink drop ejection apparatus to expel ink in a controlled manner to effect printing, comprising:

at least two reference indicia disposed on the printer but not operationally referenced to a position relative to the printer, said at least two reference indicia having a spacing between a first and a second of said at least two reference indicia, said at least two reference indicia disposed adjacent a path followed by the printhead during a printing event;

a detector, disposed in the printhead, which detects a passing by the printhead of said first of said at least two reference indicia and which detects a passing by the printhead of said second of said at least two reference indicia;

a timer which measures a period of time between said detection of said first indicia reference passage and said detection of said second reference indicia passage;

a delay which creates a delay time related to said measured period of time; and a pulse generator which activates the ink drop ejection apparatus following said created delay time.

13. A printer in accordance with the printer of claim 12 wherein said at least two reference indicia further comprise, respectively, two opaque strips disposed in a light transmitting alignment plate.

14. A printer in accordance with the printer of claim 13 wherein said two opaque strips further comprise two opaque strips divergent from each other whereby said two opaque strips are closer together at a first location in said light transmitting alignment plate than at a second location in said light transmitting alignment plate.

15. A printer in accordance with the printer of claim 13 wherein at least two said indicia reference further comprises a source of light and wherein said alignment plate further comprises first and second surfaces, said first surface disposed toward the printhead and said second surface disposed toward said source of light, whereby light is transmitted by said alignment plate from said second surface to said first surface.

16. A printer in accordance with the printer of claim 12 wherein said at least two reference indicia further comprise respectively two slits disposed in an opaque alignment plate and which transmit light.

17. A printer in accordance with the printer of claim 16 wherein said two slits further comprise two slits divergent from each other whereby said two slits are closer together at a first location in said alignment plate than at a second location in said alignment plate.

18. A printer in accordance with the printer of claim 16 wherein said reference indicia further comprises a source of light and wherein said two slits disposed in said alignment plate extend from a first surface to a second surface, said first surface disposed toward the printhead and said second surface disposed toward said source of light, whereby light is transmitted by said slits in said alignment plate from said second surface to said first surface.

19. A printer in accordance with the printer of claim 12 wherein said detector further comprises a photodetector disposed in the printhead.

20. A printer in accordance with the printer of claim 19 wherein the printhead further comprises a semiconductor substrate, a barrier material disposed on said substrate, and an orifice plate, having a plurality of orifices and at least one alignment aperture disposed therein, and disposed on said barrier material, said photodetector further disposed in said semiconductor substrate of the printhead and disposed in alignment with said at least one alignment aperture whereby light incident normal to said orifice plate passes through said at least one alignment aperture and illuminates said photodetector.

21. A printer in accordance with the printer of claim 12 wherein said detector further comprises at least two photodetectors disposed in said printhead at spaced apart locations whereby said detection of said first of said at least two refernce indicia is detected by a first of said at least two photodetectors and whereby detection of said second of said at least two reference indicia is detected by a second of said at least two photodetectors.

22. A printer in accordance with the printer of claim 12 wherein said timer which measures said period of time between detection of said first reference indicia passage and said second reference indicia passage further comprises an up/down counter activated by said detection of said first reference indicia passage and deactivated by said detection of said second reference indicia passage.

23. A printer in accordance with the printer of claim 22 wherein said delay further comprises a line selector coupled between said timer and said pulse generator.

24. A printer in accordance with the printer of claim 23 wherein said delay further comprises a shift register coupled to said line selector whereby a heater resistor firing pulse input to said shift register is delayed and a horizontal position error of the printhead is compensated.

25. A printer in accordance with the printer of claim 23 wherein said line selector further comprises a plurality of registers and wherein said delay further comprises at least three and gates coupled respectively to three adjacent registers of said line selector whereby vertical positional error is compensated.

26. A printer in accordance with the printer of claim 12 further comprising:
a second detector, disposed in the printhead, which detects a passing by the printhead of said first of said at least two reference indicia;
a second timer which measures a second period of time between said detection of said first indicia reference passage by said first detector and said detection of said passage of said first of said at least two indicia with said second detector;
a second delay which creates a second delay time related to said second period of time; and
a second pulse generator which activates a second portion of the ink drop ejection apparatus following said second delay time.

27. A printer in accordance with the printer of claim 12 wherein said second reference indicia is spaced apart from said first reference indicia by a distance not greater than said printhead width.

28. A method for dynamically compensating misalignment of a printhead employing an ink drop ejection apparatus to expel ink in a controlled manner to effect printing in a printer having an alignment mechanism, comprising the steps of:
determining a need for a first alignment cycle;
moving the printhead at a known speed and direction past the alignment mechanism which includes a first reference indicia;
detecting said passage of said first reference indicia with a first detector and a second detector;
commencing a measurement of a period of time in response to said detection of said passage of said first reference indicia with said first detector and ceasing the measurement of said period of time in response to said detection of said passage of said first reference indicia with said second detector;
delaying energization to a first portion of the ink drop ejection apparatus disposed closer to said second detector than to said first detector until a second alignment cycle is needed, whereby rotational misalignment of the printhead is compensated.

29. A method in accordance with the method of claim 28 further comprising the steps of:
moving the printhead at a known speed and direction past a second indicia of the alignment mechanism; said second reference indicia spaced apart from said first reference indicia;
detecting a passing of said second indicia;
measuring a period of time between said detection of said first reference indicia and said second reference indicia;
creating a delay time related to said measured period of time; and delaying energization of at least a second portion of the ink drop ejection apparatus for the duration of said created delay time until a second alignment cycle is needed.

30. A printer which dynamically compensates misalignment of a printhead having a printhead width hand employing an ink drop ejection apparatus to expel ink in a controlled manner to effect printing, comprising:

- a first reference indicia disposed on the printer but not operationally referenced to a position relative to the printer, said first reference indicia disposed adjacent a path followed by the printhead during a printing event;
- a first detector, disposed in the printhead, which detects a passing by the printhead of said first reference indicia;
- a second detector, disposed in the printhead, which detects a passing by the printhead of said first reference indicia;
- a first timer which measures a first period of time between said detection of said first indicia reference passage by said first detector and said detection of said detection of said first indicia passage by said second detector;
- a first delay which creates a first delay time related to said first period of time; and
- a first pulse generator which activates a first portion but less than all of the ink drop ejection apparatus following said first delay time.

31. A printer in accordance with the printer of claim 30 further comprising:

- a second reference indicia spaced apart from said first reference indicia, disposed on the printer, but not operationally referenced to a position relative to the printer, said second reference indicia disposed adjacent said path followed by the printhead during said printing event;
- said first detector further detecting a passing by the printhead of said second reference indicia;
- a second timer which measures a second period of time between said detection by said first detector of said first indicia reference passage and said detection of said second reference indicia passage;
- a second delay which creates a second delay time related to said measured second period of time; and
- a second pulse generator which activates the ink drop ejection apparatus following said second delay time.

32. A printer in accordance with the printer of claim 31 wherein said second reference indicia is spaced apart from said first reference indicia by a distance not greater than said printhead width.

* * * * *

UNITED STATES PATENT AND TRADEMARK OFFICE
CERTIFICATE OF CORRECTION

PATENT NO.    : 5,751,305                                               Page 1 of 1
DATED         : May 12, 1998
INVENTOR(S)   : LeMoyne F. Hadley It is certified that error appears in the above-identified patent and that said Letters Patent is hereby corrected as shown below:

<u>Column 11,</u>
Line 54, "refernce" should read -- reference --;

Signed and Sealed this

Fifteenth Day of October, 2002

Attest:

Attesting Officer

JAMES E. ROGAN
*Director of the United States Patent and Trademark Office*